Oct. 26, 1965

D. S. CHISHOLM 3,214,313

METHOD AND APPARATUS FOR FORMING CONTINUOUS
REINFORCED PLASTIC PIPE

Filed Aug. 10, 1964

INVENTOR.
Douglas S. Chisholm

BY Dominik and Stein
Jerome Rudy
Attorneys

Oct. 26, 1965  D. S. CHISHOLM  3,214,313
METHOD AND APPARATUS FOR FORMING CONTINUOUS
REINFORCED PLASTIC PIPE
Filed Aug. 10, 1964  2 Sheets-Sheet 2
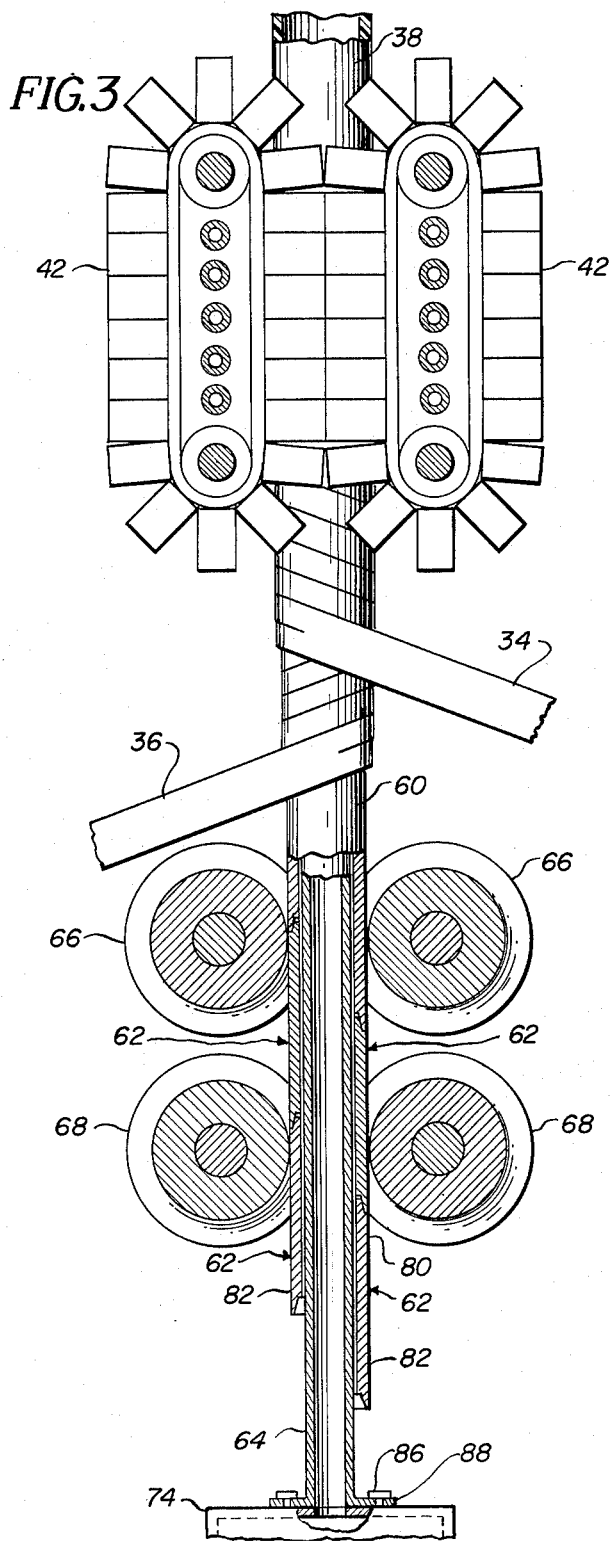
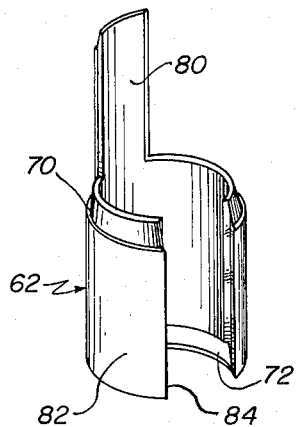
FIG. 4
INVENTOR.
Douglas S. Chisholm
BY
Attorneys

# United States Patent Office 3,214,313
Patented Oct. 26, 1965

3,214,313
METHOD AND APPARATUS FOR FORMING CONTINUOUS REINFORCED PLASTIC PIPE
Douglas S. Chisholm, Midland, Mich., assignor to The Dow Chemical Company, Midland, Mich., a corporation of Delaware
Filed Aug. 10, 1964, Ser. No. 388,606
18 Claims. (Cl. 156—155)

This invention relates to a method and apparatus for forming reinforced plastic pipe of any length desired.

This application is a continuation-in-part of a co-pending application of Douglas S. Chisholm, "Continuous Recirculating Mandrel," filed March 24, 1961, Serial No. 98,097, now abandoned.

In making continuous reinforced plastic pipe, it has been the practice to utilize some form of continuously removable and replaceable mandrel upon which pipe building material is wrapped and upon which the material is supported during curing, or during the thermosetting stage. Generally, plastic pipe made in such manner is expensive, of variable diameter, and is limited in length.

Also, the apparatus available for making the continuous reinforced plastic pipe is limited in its application to making the same from plastic material which is cured by heating, or by the addition of a catalyst and an accelerator, and without the application of pressure. It is particularly desirable to have apparatus available whereby material which is cured or set up by a combination of heat and pressure can be used.

The method and apparatus of the present invention represents a novel approach to the problem of making a reinforced plastic pipe, which pipe has good dimensional tolerance, and which may be of indefinite length. Briefly, the invention contemplates the use of a vertically arranged core support upon which a low melt point metal forming mandrel is caused to move upwardly, while pipe building materials are wrapped upon the forming mandrel. The wrapped forming mandrel is directed through a heated molding device, which simultaneously sets, or cures, the pipe material and melts the upper end of the forming mandrel, which flows downwardly by gravity through the core support to the pot from which the metal was originally drawn, for reuse in the extrusion molding of the forming mandrel.

It will be obvious that the method and apparatus of the invention may be used to make continuous reinforced plastic pipe of excellent quality, from various types of material, including material which is cured or set up by a combination of heat and pressure, in a manner which is simple, rapid, economical and efficient.

The main object of this invention is to provide a method and apparatus for forming continuous reinforced plastic pipe.

Collateral objects are the making of continuous reinforced plastic pipe of excellent quality, in a manner which is extremely simple, rapid, economical and efficient.

Other objects and features of the invention will become more apparent from the following description and accompanying drawings wherein:

FIG. 3 is an elevation view illustrative of a modified apparatus embodying the principles of the invention; and FIG. 4 is a perspective view of a tube section of the modified apparatus of FIG. 3.

Figure 1:
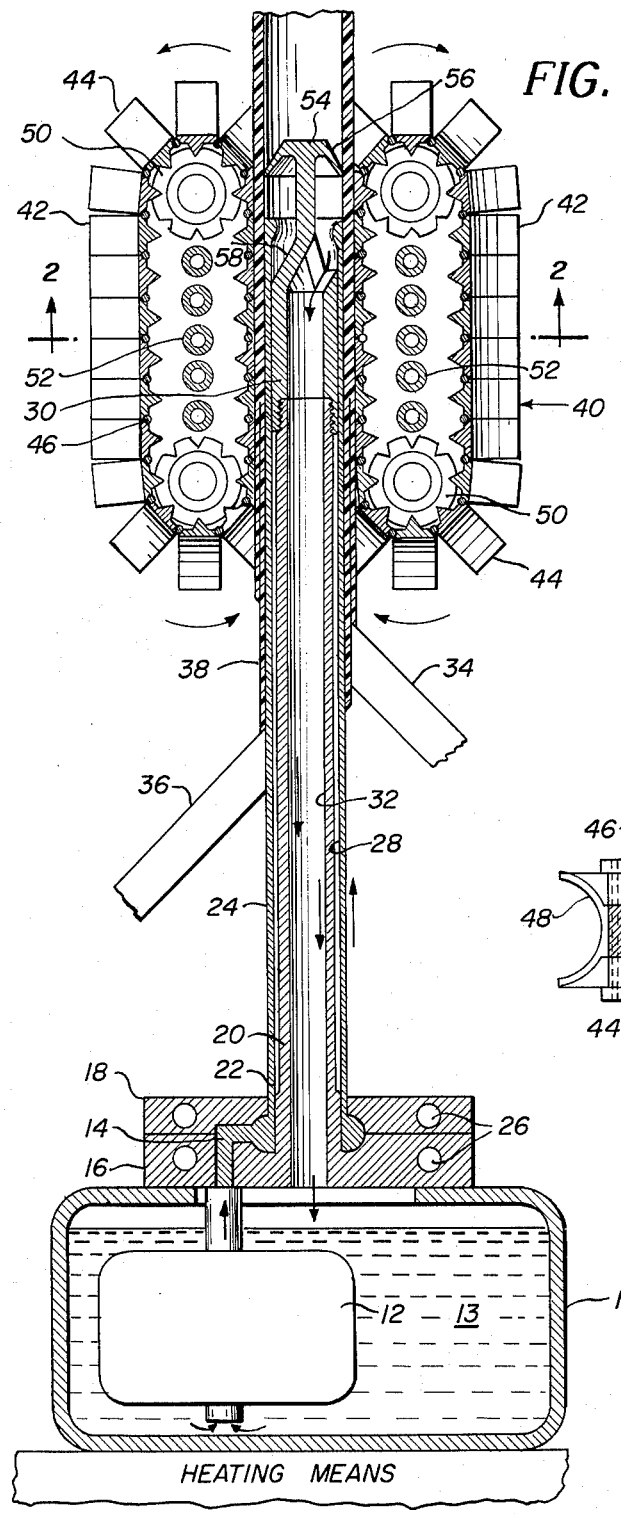
FIG. 1 is an elevation view in section illustrative of an embodiment of the invention.
Figure 2:
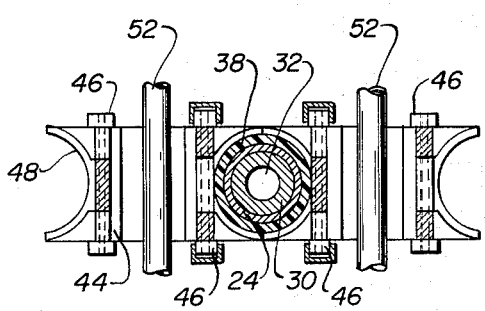
FIG. 2 is a section view generally as seen from line 2—2 in FIG. 1.

Referring now to the drawings, and more particularly to FIGS. 1 and 2, numeral 10 identifies a molten metal alloy reservoir or melting pot, in which is positioned a gear pump 12 for forcing molten alloy 13 into a passageway 14 formed in an inner nozzle plate 16 and an outer nozzle plate 18. Gas maintained in the pot 10 may be used to prevent metal oxidation. A core support 20 is arranged to extend vertically upward from the inner nozzle plate 16, passing through an opening 22 formed in the outer nozzle plate. The clearance between the opening 22 and the core support 20, is adjusted so that molten metal extruded therethrough will make a forming mandrel 24 of desired diameter and wall thickness. Cooling coils 26 are arranged in the nozzle plates 16 and 18, for conduction of a cooling medium through the plates whereby the molten metal will be solidified as it is extruded through opening 22 so that a self-supporting mandrel 24 is provided right from the opening 22 in the nozzle plate 18. That portion of the core support 20 projecting beyond the outer nozzle plate 18, is of reduced diameter to form an air space 28 between the mandrel 24 and the core support 20. A melting mandrel 30, preferably formed of iron, is affixed to the upper end of the core support 20, which mandrel 30 has an external diameter equal to the internal diameter of the forming mandrel 24. The melting mandrel 30 and the core support 20 are provided with an axial passageway 32 through which molten metal may return by gravity to the pot 10, after the upper end of the forming mandrel is melted, as will be apparent later.

As the forming mandrel 24 moves upwardly, ribbons of material 34, 36 are wrapped in opposite directions thereupon in overlap relation to form a pipe or tube 38, by wrapping means (not shown) which may be of the type well known in the art, such as the wrapping means disclosed in U.S. Patent 2,723,705 to H. W. Collins, issued November 15, 1955. The ribbons 34, 36 may consist of one of many thermoplastic materials, or fiber glass impregnated with a thermosetting or thermoplastic resin which is liquid in unset state, such as an epoxy resin, or polyester resin; the prime requisites is that the ribbons will permanently set under given conditions of heat and pressure, to form a solid tube of indefinite length.

A molding device 40 is provided, which comprises a pair of endless belts 42, each being diametrically arranged relative to the melting mandrel 30. Each belt 42 includes a plurality of guide rails 44 pivotally interlocked by bolt means 46. The guide rails 44 are each formed to provide a semi-circular groove 48 which projects outwardly from the bolt means 46. Sprocket wheels 50 are arranged internally of each belt 42 so that the guide rails 44, on the mandrel side of the belts, will engage the tube 38 via the semi-circular grooves 48, so that tube material 34, 36, is forced into snug engagement with the forming mandrel 24. A plurality of heating coils 52, preferably of the induction heater type, are positioned within each endless belt 42.

The melting mandrel 30 may have a scraper head 54 extending from the upper end thereof, which has a downwardly directed tapered flange 56 the periphery of which engages the inner wall of the tube 38 after curing, to remove any residual molten metal adhering to the inside of the tube. The scraper head has a pair of supporting legs 58 between which any metal removed by the flange 56, can fall back into the vertical passageway 32. Gas under pressure may be maintained in the tube 38 as it leaves the molding device 40, to prevent change of shape prior to cooling, which practice is common in making hollow plastic tube-like shapes. Such gas can also serve to prevent oxidation of the molten metal.

The support core 20 is of steel, and when heating coils 52 are of the induction heater type, is preferably of magnetic steel so that a magnetic flux may be established whereby induction heating is more easily accomplished.

In the operation of the above described apparatus, the air space 28 insulates the forming mandrel 24 from the hot metal returning to the pot. The metal used for the forming mandrel 24 may be a Pb-Bi alloy having a Pb content of 64–71%, which metal is characterized by insignificant volume change on passing from liquid to solid phase, and has a relatively low melting point.

It will be apparent that the disclosed apparatus will satisfy the objectives hereinbefore set forth.

A modified form of apparatus embodying the principles of the invention is illustrated in FIG. 3. Identical numerals are used to identify similar parts as used in the first described embodiment.

As will be seen, a forming mandrel 60 is made from a series of tube sections 62 formed of metal as used in the forming mandrel 24, which are sequentially placed upon a core support 64, and urged upwardly by two pairs of friction wheels 66 and 68. Wheels 66 are arranged to be driven at constant speed, while wheels 68 have a friction overdrive whereby the tube sections 62 are brought together and maintained in abutting relation.

The tube sections 62, as may be best seen in FIG. 4, have a tab 80 which projects upwardly from the main body portion 82 thereof and a slot 84 that corresponds in size and shape to the tab 80 formed in the body portion 82, opposite the tab 80. The tube sections 62 have a male end 70 and a female end 72 whereby the sections can be placed in interfitting relation, as shown, with the tab 80 of one tube section engaged in the slot 84 formed in the preceding tube section. The width of the slots 84 formed in the tube sections 62 is of sufficient width to allow the tube sections to be conveniently placed over the support core 64, either manually or by automotive means (not shown). The length of the tube sections 62 may be of any arbitrary length, so long as the apparatus is capable of handling the same.

The remaining parts of the apparatus above the wheels 66 of the second embodiment, are exactly as those shown and described in connection with the first described embodiment. A receptacle, or reservoir 74 is arranged beneath the lower end of the core support 64 for receipt of molten metal flowing downwardly in the core support. The core support 64 is supported upon the reservoir 74 by means of fastening means, such as the threaded screws 86, passed through apertures (not shown) formed in the flange 88 and the top of the reservoir 74, respectively.

In each of the above described embodiments, the metal after being returned to the reservoirs 10 and 74 is reused in the extrusion molding of the forming mandrel.

It will be seen that the second embodiment may be operated to satisfy the objectives of the invention, just as in the case of the first described embodiment. While the apparatus disclosed has been described for use in forming pipes of circular cross section, it will be apparent that pipes of different cross section viz., triangular, rectangular, etc., may be easily made by minor variations of the apparatus.

The foregoing description has been given in detail without thought of limitation since the inventive principles involved are capable of assuming other forms without departing from the spirit of the invention or the scope of the following claims.

What is claimed is:

1. A method for forming a continuous plastic pipe about a vertically supported hollow support core comprising the steps of surrounding the support core with a forming mandrel made from a relatively low melt point material, moving the forming mandrel upwardly about the support core, applying a plastic pipe forming material to the forming mandrel, passing the plastic covered forming mandrel through a molding device to press the plastic pipe material upon the forming mandrel while simultaneously heating the plastic material so that it cures and sets up into a solid pipe, melting the upper end of the forming mandrel, and returning the melted upper end of the forming mandrel by gravity through the support core.

2. A method for forming a continuous reinforced plastic pipe upon a vertically supported cylindrical support core comprising the steps of surrounding the support core with a forming mandrel made from a relatively low melt point metal, moving the forming mandrel upwardly upon the support core, wrapping a ribbon of plastic material in overlapped relation upon the forming mandrel, passing the wrapped mandrel upwardly through a molding device to press the plastic material upon the forming mandrel while simultaneously heating the plastic material so that it cures and sets up into a solid pipe, melting the upper end of the forming mandrel, and returning the melted upper end of the forming mandrel by gravity through the support core.

3. A method for forming a continuous reinforced plastic pipe upon a vertically supported cylindrical support core comprising the steps of extruding a low melt point metal upwardly about the support core to make a forming mandrel, wrapping a plurality of plastic ribbons in overlapping relation upon the forming mandrel, passing the wrapped mandrel upwardly through a molding device to press the plastic material uniformly upon the forming mandrel while simultaneously heating the plastic material so that it cures and sets up into a solid pipe, and melting the upper end of the forming mandrel so that it flows downwardly within the support core for reuse in the extrusion of the forming mandrel.

4. A method for forming a continuous plastic pipe according to claim 4, wherein the plastic ribbon is fiberglass impregnated with an epoxy resin.

5. Apparatus for forming a continuous reinforced plastic pipe comprising a hollow support core arranged in vertical position, means to surround the support core with a forming mandrel made from a relatively low melt point metal, a molding device adapted to receive the forming mandrel after it has been enclosed in plastic pipe forming material to press the pipe forming material upon the mandrel, and heating means to cure and set up the pipe forming material and to melt the upper end of the forming mandrel so that the melted metal will flow downwardly in the support core.

6. Apparatus for forming a continuous reinforced plastic pipe comprising a hollow support core arranged in vertical position, means to continuously extrusion mold a low melt point metal forming mandrel upwardly about the support core, a molding device adapted to receive the forming mandrel after a thermoplastic ribbon has been wrapped upon the forming mandrel, said molding device having means to press the ribbon upon the forming mandrel, and heating means adapted to cure and set up the ribbon to form a solid plastic pipe and to melt the upper end of the forming mandrel so that the melted metal will flow downwardly in the support core for reuse in the extrusion molding of the forming mandrel.

7. Apparatus for forming a continuous reinforced plastic pipe comprising an extrusion molding means including a molten metal reservoir, nozzle plates adapted for receipt of molten metal and the extrusion thereof in solidified cylindrical form to make a forming mandrel, and a pump for delivery of molten metal from the reservoir to the nozzle plates, a hollow support core affixed in vertical position to one of said nozzle plates and in open communication with said reservoir, said support core being arranged so that the forming mandrel is moved upwardly thereabout, a molding device adapted to receive the forming mandrel after a thermoplastic ribbon has been wrapped in overlapped relation about the forming mandrel, said molding device having means to press the ribbon upon the forming mandrel, and heating means adapted to cure and set up the ribbon to form a solid plastic pipe and to melt the upper end of the forming mandrel whereby the melted metal will flow downwardly in the support core and into the reservoir.

8. Apparatus for forming a continuous reinforced plastic pipe according to claim 7, wherein said molding device includes a pair of endless belts diametrically arranged about the forming mandrel, said belts having a plurality of guide rails each formed to provide a semicircular groove adapted for pressing engagement with the ribbon wrapped forming mandrel.

9. Apparatus for forming a continuous reinforced plastic pipe according to claim 8, wherein each of said belts is supported by a pair of sprocket wheels positioned in spaced relation in the same vertical plane and at the same distance from the axis of the forming mandrel.

10. Apparatus for forming a continuous reinforced plastic pipe according to claim 7, wherein a cylindrical melting mandrel is affixed to the upper end of the support core, said melting mandrel having an external diameter equal to the interior diameter of the forming mandrel.

11. Apparatus for forming a continuous reinforced plastic pipe according to claim 10, wherein a scraper head is affixed to the upper end of the melting mandrel, said scraper head having a downwardly directed tapered flange with a diameter substantially equal to that of the external diameter of the forming mandrel whereby the inner wall of the plastic pipe moving thereby is scraped to remove any residual molten metal adhering thereto.

12. Apparatus for forming a continuous reinforced plastic pipe according to claim 7, wherein said support core is formed to provide an air space between the support core and the forming mandrel.

13. Apparatus for forming a continuous reinforced plastic pipe according to claim 7, wherein said heating means comprises a plurality of induction heating coils.

14. A method for forming a continuous plastic pipe upon a vertically supported hollow support core comprising the steps of placing a cylindrical forming mandrel upon the support core, said forming mandrel being made from a low melt point metal, moving the forming mandrel upwardly about the support core, applying a plastic pipe forming material to the forming mandrel, passing the plastic covered forming mandrel through a molding device to press the plastic pipe material upon the forming mandrel while simultaneously heating the material so that it cures and sets up into a solid pipe, melting the upper end of the forming mandrel, and returning the melted down upper end of the forming mandrel by gravity through the support core.

15. A method according to claim 15, wherein the forming mandrel is made in the form of tube sections the ends of which are arranged to interfit.

16. Apparatus for forming a continuous reinforced plastic pipe comprising a hollow support core arranged in vertical position, a cylindrical forming mandrel positionable upon the support core, said forming mandrel being made from a low melt point metal, means to move the forming mandrel upwardly upon the support core, a molding device adapted to receive the forming mandrel after a thermoplastic ribbon has been wrapped upon the forming mandrel and to press the thermoplastic ribbon upon the mandrel, and heating means adapted to cure and set up the ribbon to form a solid plastic pipe and to melt the upper end of the forming mandrel so that the melted metal will flow downwardly in the support core.

17. Apparatus according to claim 16, wherein the forming mandrel is made in the form of tube sections the ends of which are arranged to interfit.

18. Apparatus for forming a continuous reinforced plastic pipe comprising a hollow support core arranged in vertical position, a cylindrical forming mandrel positionable upon the support core, said forming mandrel being made from a low melt point metal in the form of tube sections, each of which has a main body portion, a slot formed in said main body portion of sufficient width to allow said tube sections to be placed upon said support core and tab means extending from said main body portion corresponding in size and shape to said slot, said forming mandrel being constructed by engaging said tube sections upon said support core with said tab means on one of said tube sections engaged in said slot on a preceding one of said tube sections, means to move the forming mandrel upwardly upon the support core, a molding device adapted to receive the forming mandrel after a thermoplastic ribbon has been wrapped upon the forming mandrel and to press the thermoplastic ribbon upon the mandrel, and heating means adapted to cure and set up the ribbon to form a solid plastic pipe and to melt the upper end of the forming mandrel so that the melted metal will flow downwardly in the support core.

References Cited by the Examiner

UNITED STATES PATENTS 2,723,705  11/55  Collins.
2,993,526   7/61  Young _____ 156—155
3,113,897  12/63  Honningstad et al. _____ 156—155

EARL M. BERGERT, *Primary Examiner.*